United States Statutory Invention Registration [19]

[11] Reg. Number: H689

Christiansen et al. [43] Published: Oct. 3, 1989

[54] FUEL PIN

[75] Inventors: David W. Christiansen, Kennewick; Richard A. Karnesky, Richland; Robert D. Leggett, Richland; Ronald B. Baker, Richland, all of Wash.

[73] Assignee: The United States of America as reprsented by the United States Department of Energy, Washington, D.C.

[21] Appl. No.: 124,709

[22] Filed: Nov. 24, 1987

[51] Int. Cl.[4] ..... G21C 3/00

[52] U.S. Cl. ..... 376/361; 376/422; 376/428; 376/450; 376/453; 376/903

[58] Field of Search ..... 376/409, 450, 453, 903

[56] References Cited

U.S. PATENT DOCUMENTS

| | | | |
|---|---|---|---|
| 3,034,975 | 5/1962 | Beurtheret | 376/903 |
| 3,043,761 | 7/1962 | Reynolds . | |
| 3,157,580 | 11/1964 | Williams | 376/450 |
| 3,356,584 | 12/1967 | Ockert | 376/453 |
| 3,964,967 | 6/1976 | Nelson . | |
| 4,282,064 | 8/1981 | Hayashi et al. . | |

FOREIGN PATENT DOCUMENTS

| | | | |
|---|---|---|---|
| 980298 | 1/1965 | United Kingdom | 376/903 |
| 2116354 | 9/1983 | United Kingdom | 376/426 |

OTHER PUBLICATIONS

Henault et al., "Xenon Tag Proof Test", *Detection Instruments and Their Applications,* p. 798.

*Primary Examiner*—Deborah L. Kyle
*Assistant Examiner*—Richard W. Wendtland
*Attorney, Agent, or Firm*—Edward V. Hiskes; Robert Southworth, III; Judson R. Hightower

[57] ABSTRACT

A fuel pin for a liquid metal nuclear reactor is provided. The fuel pin includes a generally cylindrical cladding member with metallic fuel material disposed therein. At least a portion of the fuel material extends radially outwardly to the inner diameter of the cladding member to promote efficient transfer of heat to the reactor coolant system. The fuel material defines at least one void space therein to facilitate swelling of the fuel material during fission.

21 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUEL PIN

CONTRACTUAL ORIGIN OF THE INVENTION

The invention described herein was made in the course of, or under, a contract with the United States Department of Energy.

BACKGROUND AND SUMMARY OF THE INVENTION

This invention relates generally to a liquid metal nuclear reactor fuel pin, and more particularly to a fuel pin having an improved metallic fuel arrangement.

Conventional metallic fuel pin assemblies typically include pressure cast fuel alloys which are loaded into cylindrical cladding tubes sealed at their ends. Mechanical interaction during fission between the fuel and cladding is prevented by a large radial gap. Typically this gap takes up about 25% of the volume within the cladding tube. Also included in the pin is a fission gas plenum in the form of a chamber which receives fission gases released by the fuel during operation of the reactor.

Because of the high thermal conductivity of metallic fuels (20 W/m-k) and their relatively low melting points (approximately 2200° F.), the existence of the large gas gaps, without any coolant bond, could cause excessive fuel temperature and perhaps even fuel melt. This is undesirable because it would redistribute the fuel to the bottom of the fuel column, which would disturb the porosity balance and render the location of the fuel material somewhat unpredictable.

To preclude fuel melting, prior designs have provided a sodium thermal bond between the fission material and the cladding. The high thermal conductivity of the sodium, compared to gas, keeps fuel temperatures acceptable. During operation, metallic fuel swelling closes the gap between fuel and cladding, and this displaces the sodium away from the fuel and into the fission gas plenum. This displacement reduces the available fission gas plenum volume, which diminishes the capacity of the system, or requires additional fuel pin length. Any such increase in length dramatically increases reactor containment costs.

Another limitation of conventional fuel pin designs is that the use of a sodium thermal bond normally requires that the fission gas plenum be disposed above the fuel, in an upper part of the fuel pin. This leads to inefficient utilization of fission gas plenum space because the reactor coolant system circulates coolant upwardly between the various fuel pins. Thus, system coolant passes the fuel region before it passes the plenum. The resulting heating of the coolant prior to contact with the plenum increases the fission gas plenum pressure and temperature, or requires additional fuel pin length. This length increase again dramatically increases reactor containment costs.

There are other drawbacks with the use of sodium or another coolant as a thermal bond between the fuel and the cladding. Because of the proximity of the coolant to the metallic fuel, it is an additional contaminated waste product which must be dealt with in reprocessing the fuel elements. Clean up and/or storage of such waste products is very expensive and troublesome. Finally, the requirement of a fuel pin thermal bond also increases the expense of the system.

Another disadvantage with existing metallic fuel systems is that there is typically far more power being generated from the areas near the axial center of the fuel stack than is being generated near the ends of the fuel stack. This is because the neutron concentration is greater near the axial center of the fuel stack than at the ends of the fuel stack where neutron leakage occurs. It has long been thought that if there was a way to increase the power output adjacent the ends of the fuel stack, then a dramatic increase in power output could be realized.

Yet another typical feature of existing systems is a tag gas capsule which contains a tag gas comprising specific mixtures of different isotopes of gases that can readily be sensed from a position outside of the reactor core. Thus, if there is leakage from one or more of the fuel pins, such leakage can readily be determined. It is also possible to use different gas mixtures for each fuel assembly position so that the tag gas sensor can determine in which fuel assembly position there is a leak as well as the presence of a leak.

In one embodiment of the present invention, there is disclosed a fuel pin design which includes a temperature sensitive tag gas capsule that releases tag gas into the fuel pin during reactor operation. By releasing tag gas into the fuel pin during reactor operation, the power-to-melt characteristics during reactor start up is improved.

Another embodiment of the invention discloses a fuel design which permits the elimination of the tag gas capsule while still providing pin leakage sensing capability. Eliminating of the tag gas capsule reduces the cost of the reactor both by eliminating an additional component and by decreasing the necessary length of the fuel pin.

It is an object of the present invention to avoid the drawbacks and limitations in the prior art. More specifically, the invention has as objects the following: (1) to develop a fuel system for a nuclear reactor which does not require a thermal bond between the fuel material and the cladding; (2) the provision of a fuel pin design which increases the effective amount of plenum space to receive fission gases, without increasing the size of the fuel pin; (3) to provide a nuclear power plant which generates less contaminated waste than conventional designs; (4) to provide a fuel pin design which results in more effective transfer of heat from the fuel pin to the reactor coolant system; (5) to develop a fuel pin which effectively increases the amount of power generated adjacent the ends of the fuel stack; (6) to provide a tag gas capsule which is temperature sensitive and releases tag gas within the fuel pin during reactor operation; (7) the provision of a fuel design which permits the elimination of the tag gas capsule, while still providing pin leakage sensing capability; and (8) to provide various fuel system alternatives which maximize reactor output while permitting a simplification of plant design.

The present invention achieves the above objects by providing various means for adding porosity to the fuel stack. Another way to describe the invention is to provide means for decreasing the effective smear density of the fuel. Such means could take the form of one or more axially extending channels extending through the fuel. They could take the form of spaced, axially extending peripheral flutes. Another alternative would be to provide small radial gaps or voids within the stack, or to form fuel spheroids which would provide the desired porosity.

Because the invention permits elimination of the annular fuel-to-cladding gap, radial transfer of heat from the pin to the reactor coolant system is enhanced, thus preventing fuel melt and resulting axial relocation. Expansion of the fuel is facilitated by the axial channels or the initial porosity of the fuel; that is, the channels or gaps in the fuel merely fill with the expanding fuel as fission is taking place.

A particular advantage of the use of spheroids or some other configuration which exhibits internal radial porosity is that means can be provided for exerting pressure on the end regions of the fuel stack. This pressure does not typically pass through the entire stack, so that the end regions are compacted more than the center region, thus increasing the amount of fuel at those portions. This permits a flattening of the axial fuel pin power distribution curve which can result in significant increases in reactor power output without any meaningful increase in assembly or operating expense.

Another advantage of the porous fuel stack of the present invention is that tag gas can be injected directly into the fuel region of the pin. Thus, as the fuel swells during fission, that gas is passed into the fission gas plenum. If there is leakage in the pin, the tag gas will pass out of the pin, just as though a separate tag gas capsule was provided.

Other objects, features and advantages of the present invention will become apparent upon reading the following detailed description in conjunction with the accompanying drawings.

DETAILED DESCRIPTION OF THE PREFERRED EMBODIMENTS

FIGS. 1–4 depict several different embodiments of the fuel design of the present invention. In all, the effective smear density of the fuel is significantly less than that of a conventional fuel stack. Standard metallic reactor fuels are utilized, such as U-Zr and U-Pu-Zr. Other metallic fuels may alternatively be included. The invention does not have any applicability to nonmetallic, ceramic fuels because those fuels exhibit far less thermal conductivity than metallic fuels (2.5 W/m-k versus 20 W/m-k), and have much higher melting points (5000° F. versus 2200° F.). Ceramic fuels exhibit very little swelling, so the need for the porosity included in the present invention does not exist.

Figure 1:
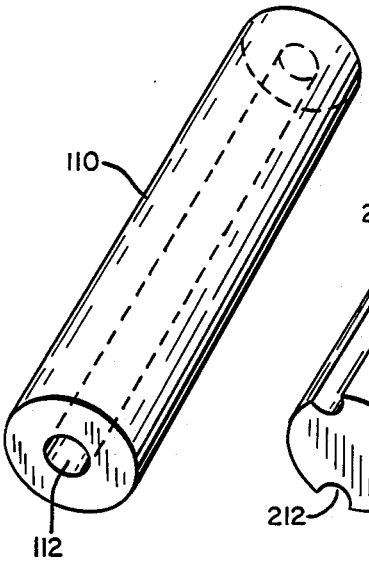
FIG. 1 is a schematic, perspective view of a first embodiment of the fuel design of the present invention.

FIG. 1 depicts a fuel form 110 including a longitudinally or axially extending channel 112. Channel 112 is typically formed when the fuel form 110 is cast. As will be explained more fully below, fuel form 110 completely fills the space defined within the cladding, but the presence of axial channel 112 results in the effective smear density of the fuel being less than if the channel was not included Total smear density will now be in the range of about 70 to 75%. Fuel form 110 is normally cast so that axial channel 112 is formed at that time. Alternatively, axial channel may be drilled or formed by other methods.

Figure 2:
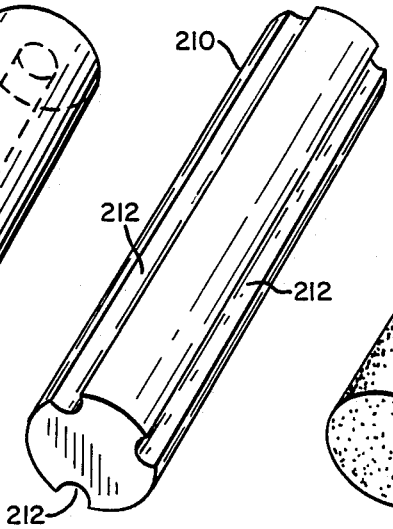
FIG. 2 is a schematic, perspective view of a second embodiment of the fuel design of the present invention.

FIG. 2 depicts another fuel form 210, which includes a plurality of peripheral, axially extending flutes 212. Again, like the axial channel 112 in fuel form 110, the flutes 212 result in a decreased smear density.

Figure 3:
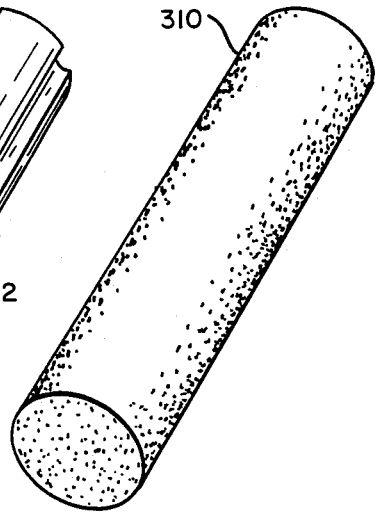
FIG. 3 is a schematic, perspective view of a third embodiment of the fuel design of the present invention.

FIG. 3 depicts a third fuel form 310 which is homogeneously porous and is comprised of powdered fuel. As the powdered fuel is loaded, such as with a vibrating feeder, it may be permeated with tag gas, which would then permit the elimination of a tag gas capsule in the fuel pin. Binary uranium zirconium powder would be one such powder that may be utilized for this embodiment.

Figure 4:
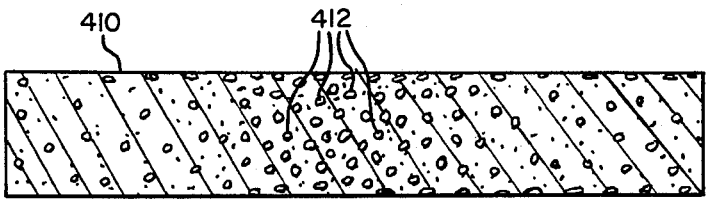
FIG. 4 is a schematic side elevation sectional view of a fourth embodiment of the fuel design of the present invention.

FIG. 4 depicts a fourth fuel form 410 which includes a plurality of gas voids 412 therein, created by the injection of gas into a molten fuel rod during the molding process. The gas may take the form of tag gas, which would eliminate the requirement of a tag gas capsule. The voids 412 within fuel form 410 are relatively evenly distributed in radial directions. However, fuel form 410 has been shown in section to show that the depicted form is not axially homogeneous. This aspect of the invention permits the fuel to be more concentrated at the ends of the form than at the central regions. The variation in the axial power profile would normally be in the neighborhood of about 50%, peak to minimum. This is a desirable feature because typically fission is more efficient in the axially central region of the pins. By concentrating more fuel adjacent the end regions, the axial pin power distribution curve can be flattened, with the potential of dramatically increasing power output. This is accomplished without decreasing the total amount of fuel in the fuel pin because, except for the voids 412, fuel form 410 extends outwardly all the way to the cladding. In prior designs, the fuel was more concentrated, but the requirement of the sodium thermal barrier between the fuel and the cladding reduced, by as much as 25% or more, the available space for the fuel.

This axial variation of fuel density may also be achieved with fuel form 310 of FIG. 3 by compressing the ends thereof. The forces of compression typically would not pass entirely through the powdered fuel material, so that the fuel would be more compressed adjacent the end regions.

Figure 5:
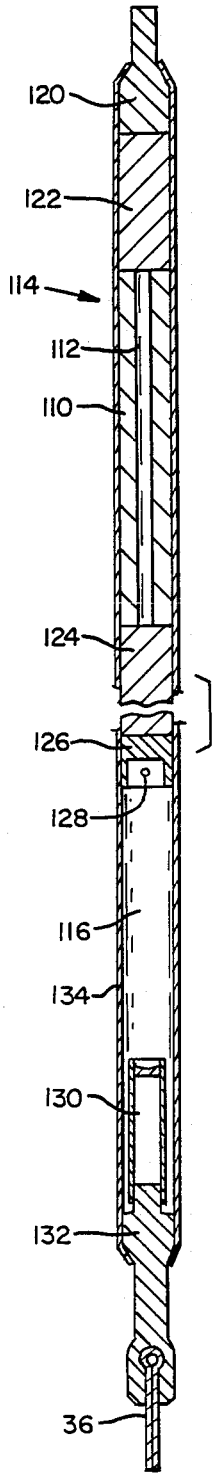
FIG. 5 is a simplified side elevation sectional view of a first fuel pin design made possible by the present invention.
Figure 6:
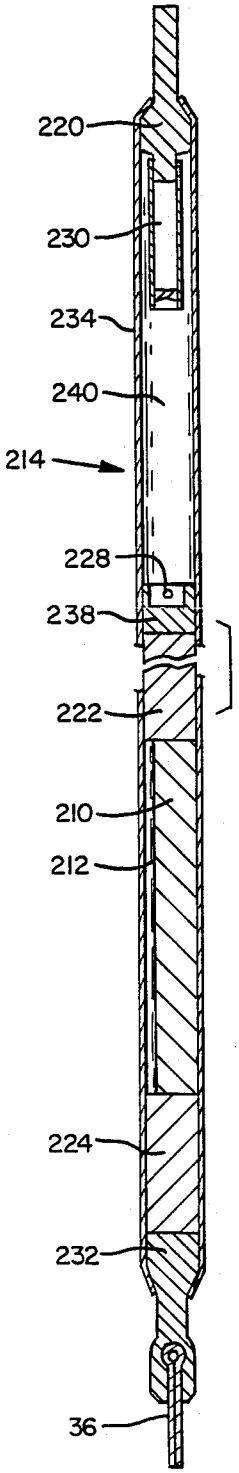
FIG. 6 is a simplified side elevation sectional view of a second fuel pin design made possible by the present invention.
Figure 7:
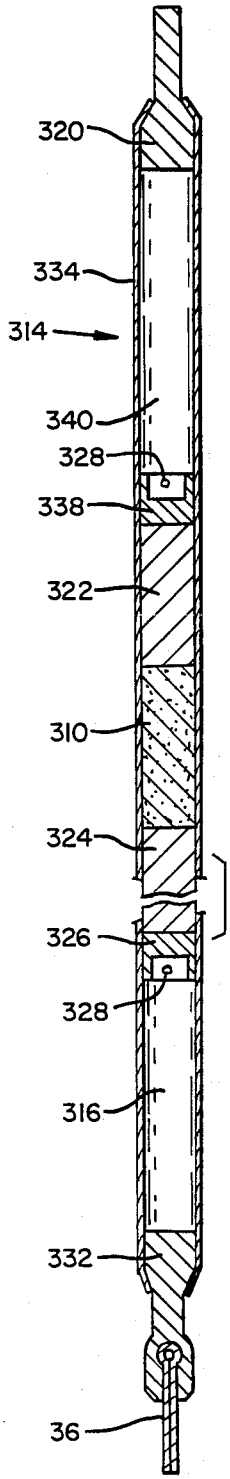
FIG. 7 is a simplified side elevation sectional view of a third fuel pin design made possible by the present invention.

FIGS. 5–7 schematically depict various fuel pin configurations made possible by the present invention. The basic difference between these three configurations is the number and position of the fission gas plenums. FIG. 5 illustrates a fuel pin, indicated generally with the numeral 114. Fuel pin 114 includes a single, lower fission gas plenum 116 disposed below fuel form or fuel material 110. Although fuel form 110, with axial channel 112, has been included in fuel pin 114 for illustration, it should be understood that any one of the other fuel forms, 210, 310 or 410 could alternatively be provided. With each of these fuel forms, at least a portion of the fuel material extends radially outwardly to the cladding member. Of course, depending upon the fuel form used, there may be slight manufacturing clearances in the range of 0.008 inch or so. However, for the purposes of this description, such fuel forms will still be considered to be extending out to the cladding.

Also included in fuel pin 114 are a top end cap 120 and an upper blanket filled with fertile material such as depleted uranium, which enhances fission in the fuel region. Alternatively, a reflector, such as Inconel 600, may be used to reflect neutrons back into the fuel material. Both of these components are positioned above fuel material 110. A lower blanket 124 is disposed immediately below fuel material 110, and is held in position against fuel material 118 by a lower lock plug 126. A tag gas capsule 130, the details of which will be explained, is disposed in the lower portion of plenum 116, and is mounted against a bottom end cap 132 of fuel pin 114. Cladding 134 is provided to cover fuel pin 114. The fuel pin 114 is shown to be mounted to an attachment rail 36.

Top and bottom end caps 120 and 132, upper and lower blankets 122 and 124, cladding 134, and attachment rail 36 are all of conventional design.

Unlike conventional designs, fuel form 110 extends radially outwardly to the cladding 134, and does not include a sodium thermal barrier. In conventional designs, the thermal barrier serves to fix the position of the fuel material. In the depicted fuel pin 114, fuel form 110 is fixed in position by lower lock plug 126. As depicted, lower lock plug 126 is substantially cup-shaped, and fits against the inner walls of cladding 134. A swage tool (not shown) is used to push lower lock plug 126 into position and form dimples 128 in the lock plug and the adjacent cladding 134. The fit between lower lock plug 126 and cladding 134 is such that fission gases which are generated in fuel material 110 can pass through lower blanket material 124 and through the interface between the lock plug and the cladding, and into plenum 116.

The configuration of the fuel pin of FIG. 6 is very similar to that of FIG. 5 except for the position of the fission gas plenum; therefore, the components have been numbered with corresponding numbers in the 200 series. While fuel form 210, having axial flutes 212, is shown to be included, the other fuel forms 110, 310 and 410 alternatively may be used. Fuel pin 214 includes a top end cap 220 and a tag gas capsule 230, the details of which will be explained, disposed at the upper end of an upper fission gas plenum 240. An upper lock plug 238, having swaged dimples 228, is disposed against an upper blanket 222, which is positioned immediately above the fuel material 210. A lower blanket 224 is disposed below the fuel, immediately above a bottom end cap 232. Conventional cladding 234 covers fuel pin 214, and it is mounted to an attachment rail 36.

The configuration of the fuel pin 314 of FIG. 7 is also similar except that it includes both a lower and an upper fission gas plenum chamber 316 and 340. Fuel form 310 is depicted although again, the other forms may alternatively be included. Fuel pin 314 includes a top end cap 320, lower and upper lock plugs 326 and 338 with swaged dimples 328, upper and lower blankets 322 and 324, cladding 334, and a bottom end cap 332 which is adapted to be mounted to an attachment rail 36.

Figure 8:
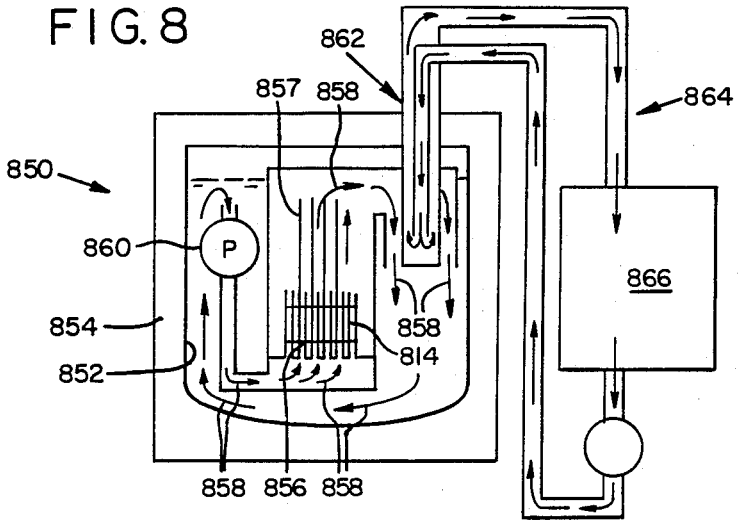
FIG. 8 is a simplified schematic view of a nuclear power plant in which the present invention may be utilized.

FIG. 8 is a simplified schematic depiction of a liquid metal fast reactor, prototypic of a pool-type of reactor. While FIG. 8 does not depict any of the preferred embodiments of the invention, the figure will be used to describe the operation of the depicted designs. The reactor has been generally identified with the numeral 850. It includes a primary vessel 852 of heavy stainless steel which is contained in a reinforced concrete protective housing 854. The active core region, indicated generally at 856, contains nuclear fuel or fissile material and is disposed within primary vessel 852. Fuel is deposited in the previously-described fuel pins, indicated generally and schematically in FIG. 8 as 814. The fuel pins are then spaced inside fuel assemblies, although such assemblies have not been shown in FIG. 8. The fuel assemblies are surrounded by rows of reflector assemblies (not shown). Interspersed among the fuel assemblies are movable control rods 857, which are made of neutron absorptive material, and are used to control the rate at which fission occurs in the reactor 850. Only a few of these control rods 857 have been depicted, for simplification purposes.

A coolant system, such as liquid sodium 858, is drawn from a pool in primary vessel 852 and is pumped through the core by a pump 860. This coolant 858 flows through each fuel assembly and between the fuel pins 814, traveling in an upward direction. The liquid sodium coolant 858 then passes from the top of core 856 through intermediate heat exchangers 862, where it releases its heat to a secondary sodium coolant system, shown generally at 864. Secondary sodium coolant system 864 is used to generate steam in a steam generator system 866.

Figure 9:
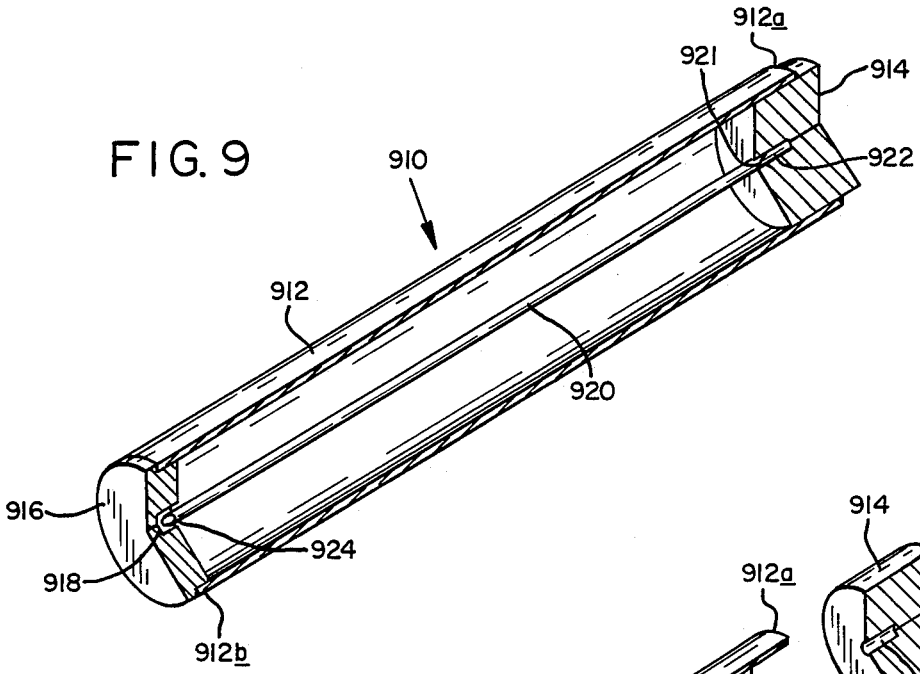
FIG. 9 is a perspective view, with portions broken away to show detail, of a tag gas capsule constructed in accordance with one embodiment of the invention.
Figure 10:
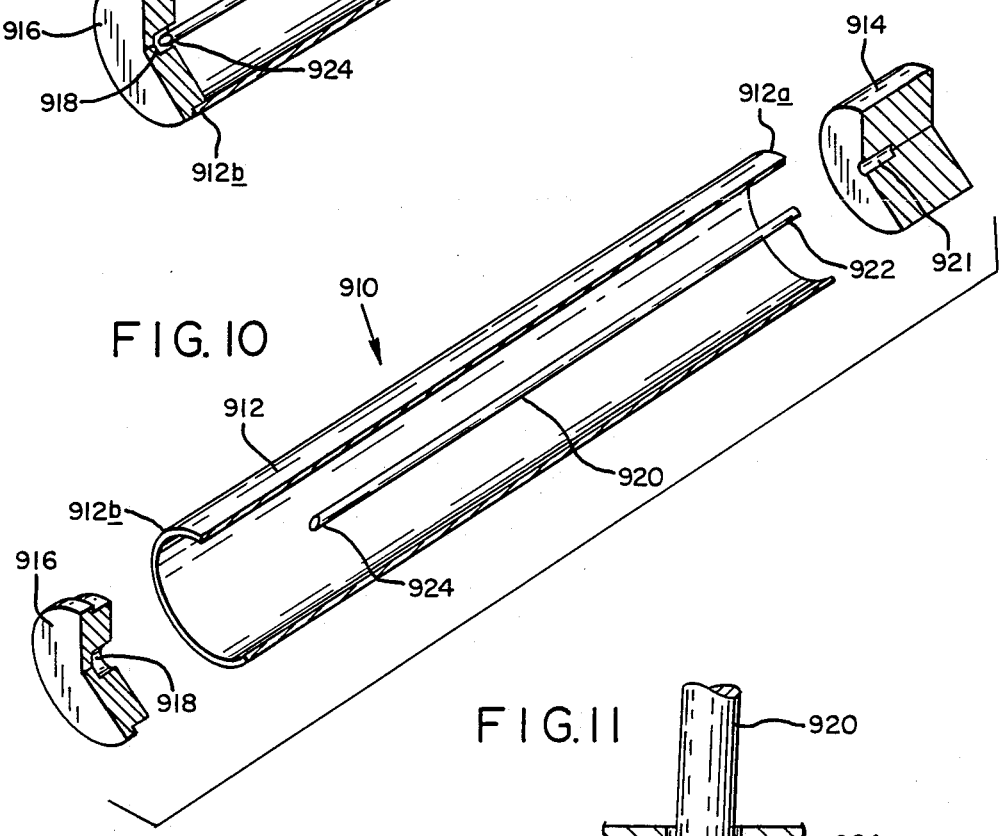
FIG. 10 is an exploded perspective view of the tag gas capsule depicted in FIG. 9.
Figure 11:
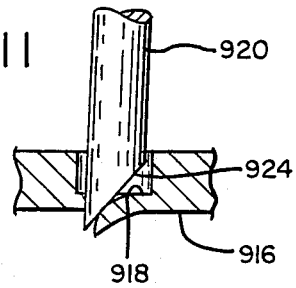
FIG. 11 is an enlarged cross-sectional view of a penetrator member and a bottom end cap of the tag gas capsule depicted in FIGS. 9 and 10.

In the fuel pin designs depicted in FIGS. 5 and 6, tag gas capsules, such as capsules 130 and 230, are included. While a conventional tag gas capsule may be used in those designs, in one preferred embodiment of the invention, a novel tag gas capsule, shown generally at 910 in FIGS. 9–11, is included. As best seen in FIGS. 9 and 10, tag gas capsule 910 includes a tube 912 which has a top end **912*a* and a bottom end 912*b*. Tube 912 also includes a top end cap 914 and a bottom end cap 916. Bottom end cap 916 has a centrally disposed inner well 918** which comprises an undercut portion of the bottom end cap and is capable of being ruptured.

Capsule 910 further includes an axially extending, centrally disposed penetrator member or rod 920 having an upper end 922 fixedly mounted centrally in a bore 921 disposed in top end cap 914. Although rod 920 is shown in FIGS. 9–11 as being cylindrical, it may also be rectangular or polyhedral. Rod 920 has a lower end 924 which may be pointed or angled as depicted in FIGS. 9–11, or it may be flat.

The external configuration of inner well 918 of bottom end cap 916 is generally complementary to the external configuration of penetrator member 920, and the width of well 918 is at least as large as the width of penetrator member 920. While FIG. 11 illustrates a loose fit between penetrator 920 and well 918, in certain applications a closer fit may be desired in order to assist in the lateral support of penetrator 920.

Penetrator member 920 is constructed of an alloy or material with a relatively high coefficient of thermal expansion, and tube 912 is constructed of an alloy or material with a relatively low coefficient of thermal expansion. For example, with a 3.12 inch long tube, it is anticipated that a differential thermal expansion of 0.009 inches could be achieved using a 20% CW 316 stainless steel penetrator member and a 2.25% Cr/1% Mo steel tube. This expansion difference is more than adequate to insure penetration of inner well 918.

Assembly of capsule 910 is performed by positioning bottom end cap 916 on tube 912 and seal welding the tube bottom end. End 922 of penetrator member 920 is then inserted into bore 921, and brazed into place. Top end cap 914 with penetrator 920 is then inserted into tube 912 with end cap 916 so that the penetrator seats in well 918 of bottom end cap 916. A known preload is applied between the top end cap and the bottom end cap, and the top end of tube 12 is seal welded. Capsule 910 is inserted into a gas pressure chamber (not shown) and laser drilled at one end. The gas pressure in the capsule is then depressurized, back filled and pressurized with tag gas, and laser welded.

When the capsule is placed in a fuel pin during reactor start up, an increase in fuel temperature will cause penetrator member 920 to expand axially more than tube 912 causing penetrator end 924 to rupture well 918 of the end cap thereby releasing tag gas into the fuel pin. Rupture of end cap 916 will occur at the peak of the fuel pin operating temperature profile (approximately 800° F.), which is after the fuel slug-to-cladding-gap closure has begun.

By delaying the release of a gas until peak operating temperatures are reached, the power to melt characteristics are improved. First, xenon, a widely used tag gas, has a low heat transfer coefficient. Therefore, when xenon is present in the gap in the fuel pin between the fuel slug and the cladding prior to fuel slug restructuring and closure of the gap, there is a reduction of the heat transport capabilities from the fuel to the sodium coolant. Consequently, a lower power to melt characteristic is obtained by releasing tag gas into the fuel pin prior to fuel utilization. By delaying the injection of the tag gas as disclosed in the present invention, there is an improvement in the heat transport characteristics from the fuel to the sodium coolant and a concomitant increase in the power to melt characteristics during initial start up.

Also, by delaying tag gas injection until after the closure of the fuel slug-to-cladding-gap has begun, the power to melt characteristics during reactor start up is further improved. Improvement in the power to melt characteristics during reactor start up can result in significant cost savings.

Moreover, use of this novel tag gas capsule which ruptures in-core eliminates the need to use verification equipment during fabrication, such as with conventional tag gas capsules which are ruptured in the fuel pin and then verified prior to insertion in the reactor.

It is important to note that although we have disclosed this novel tag gas capsule in connection with use in a liquid metal reactor, this aspect of the invention could also be used in other types of fast reactors.

OPERATION OF THE DEPICTED EMBODIMENT

The operation of the fuel pin 114 of FIG. 5 will first be described, although it will be appreciated that the operation of the embodiments of FIGS. 6 and 7 are quite similar. When the control rods 857 (see FIG. 8) are partially withdrawn and fission begins within the fuel material 110, heat begins to build up. Because the radial periphery of fuel material 110 is in abutment with the inner diameter of cladding 134, substantial amounts of heat are conveyed through the cladding and into the liquid sodium coolant 858 (FIG. 8). Thus, even in the initial stages of fission, heat is being transferred to the secondary coolant system 864 and to the steam generator system 866.

As fission continues in fuel pin 114, the fuel material 110 swells, and this swelling begins to fill axial channel 112 in fuel form or material 110. If other fuel forms 210, 310 or 410 are utilized, such swelling would correspondingly fill the channels or voids in those forms.

As fission progresses, fission gases are generated. These gases leach downwardly through the lower blanket 124 and pass through the cladding/lower lock plug interface, and into lower plenum 116. These gases are quite hot so it is a very real advantage of the present invention that the plenum can be located adjacent the lower portion of fuel pin 114. Because liquid sodium coolant 858 is passing upwardly between the fuel pins 814, that coolant will be much cooler as it passes a lower plenum than if it passed the fuel region of the fuel pin prior to flowing past an upper plenum. This results in lower temperatures and gas pressures in a lower plenum, which, in turn, increases the effective capacity of the lower plenum or may even permit reduction in plenum size. In conventional fuel pins (not shown), the presence of the sodium thermal bond normally requires that the plenum be disposed above the fuel region. As discussed above, the presence of the sodium thermal bond in such systems also has the drawback of taking up as much as 25% or more of the space in the fuel region, and during fission will also be taking up valuable space in the plenum as the sodium melts and is forced into the plenum by the swelling fuel material.

The operation of the fuel pin 214 in FIG. 6 is similar to that of 114 except for the fact that there is an upper plenum 240, rather than a lower plenum. Therefore, the plenum lengths would be equal to that of the sodium bonded fuel pin, except that the sodium no longer is present to take up space in the plenum. An advantage of fuel pin 214, however, is that it shows that the invention permits retrofitting in existing reactors. Therefore, the design of the entire reactor would not have to be substantially modified to adopt the fuel forms of FIGS. 1–4. In fact, the reactor could be upgraded to increase power production.

Fuel pin 314 of FIG. 7 also operates in a similar fashion except that the fission gases will flow into both an upper and a lower plenum, 340 and 316, respectively. A particular advantage with this embodiment is that it includes both an upper and a lower lock plug 338 and 326, which can be exerting pressure against both sides of the fuel material 310. This construction has the advantage of concentrating fuel adjacent the axial ends of the fuel, which increases fission and power production at those regions. This construction also tends to flatten out the axial power distribution curve, which can dramatically increase the efficiency and productivity of the reactor. It should be appreciated that this axial compression of the ends of the fuel material can also be performed in fuel pins 114 and 214, but is probably most efficiently done with the design of fuel pin 314.

One other difference in fuel pin 314 is that it deletes the tag gas capsules shown in other depicted embodiments. This deletion is possible when fuel form 310 has been impregnated with tag gas. Thus, if there is a leak in fuel pin 314, the impregnated tag gas will pass out of the fuel pin during fission just as if a tag gas capsule were included. Elimination of the tag gas capsules in the other depicted fuel pin designs is also possible if tag gas has been impregnated into the fuel forms of those pins as well.

Finally, fuel form 410 of FIG. 4 permits the concentration of fuel adjacent the axial ends without requiring any axial compression. Thus, fuel form 410 may be used in any one of the depicted fuel pins equally well. The other advantages of fuel form 410 is that it readily facilitates the impregnation of tag gas into its voids 412, which permits elimination of the tag gas capsule.

It should be understood that various changes and modifications to the preferred embodiment described herein will be apparent to those skilled in the art. These and other changes and modifications can be made without departing from the spirit and scope of the present invention and without diminishing its attendant advantages. It is, therefore, intended that such changes and modifications be covered by the following claims.

We claim as our invention:

1. A fuel pin for a liquid metal nuclear reactor comprising:

a generally cylindrical cladding member; and metallic fuel material disposed within said cladding member, with at least a portion of said fuel material extending radially outwardly to the inner diameter of said cladding member, said fuel material defining at least one void space to facilitate swelling of said fuel material during fission.

2. The fuel pin of claim 1, wherein said void space is filled with tag gas to permit sensing of a leak in the fuel pin.

3. The fuel pin of claim 1, wherein said void space is disposed radially inwardly spaced from said cladding, and the entire radial periphery of said fuel material extends to said cladding member.

4. The fuel pin of claim 2, wherein said void space is defined by a plurality of axially extending flutes disposed adjacent the radial periphery of said fuel material, adjacent said cladding.

5. The fuel pin of claim 1, wherein said void space includes a radially centrally disposed, axially extending channel.

6. The fuel pin of claim 1, wherein a plurality of said void spaces are spaced throughout said fuel material, with more of said void spaces being disposed toward the axial center of said fuel material than toward the axial ends thereof.

7. The fuel pin of claim 1, wherein a plurality of said void spaces are included, said void spaces being minute and spaced throughout said fuel material.

8. The fuel pin of claim 7, wherein more of said void spaces are disposed toward the axial center of said fuel material than toward the axial ends thereof.

9. The fuel pin of claim 1, further comprising a first plenum defined within said cladding member for receiving fission gases from said fuel material, and a first lock plug means disposed between said first plenum and said fuel material, for providing axial pressure against said fuel material and for permitting leakage of fission gases from said fuel material to said first plenum.

10. A fuel pin of claim 1, further comprising blanket material being disposed immediately axially adjacent each axial end of said fuel material.

11. The fuel pin of claim 1, wherein said fuel material is comprised of powder.

12. The fuel pin of claim 1, wherein said fuel material is comprised of minute spheroids.

13. The fuel pin of claim 1, further comprising a temperature sensitive tag gas capsule disposed within said cladding member, for releasing tag gas into said cladding member during reactor operation, which capsule includes an elongate tube having a top end and a bottom end and having a top end cap and a bottom end cap fixed to said top and bottom ends with at least one of said end caps being rupturable, and an axially extending, centrally disposed penetrator member which has a higher thermal coefficient of expansion than said tube, such that upon reactor temperature increase said penetrator member expands at a faster rate than said tube, causing rupture of said one end cap.

14. The fuel pin of claim 13, wherein said penetrator member is an elongate rod having one end fixedly mounted centrally to said top end cap, and wherein said tube is fixedly mounted to said bottom end cap, and wherein said bottom end cap includes a centrally disposed rupturable inner well with the other end of said rod extending within said well.

15. The fuel in of claim 14, wherein said inner well comprises an undercut portion of said bottom end cap.

16. The fuel in of claim 15, wherein the width of said inner well is at least as large as the width of said rod.

17. The fuel pin of claim 16, wherein the external configuration of said inner well is complementary to the external configuration of said penetrator member.

18. The fuel pin of claim 13, which further comprises a tag gas disposed in said capsule.

19. A liquid metal reactor comprising:

a protective housing;

core region with fissile material therein, said core region being disposed within said housing;

control means for absorbing neutrons disposed within said housing;

a coolant system for circulating coolant liquid adjacent said core region; and a plurality of fuel pins, with at least a portion of each of said fuel pins being disposed within said core region, said fuel pins including metallic fuel material extending radially outwardly substantially all the way to the radial periphery of said fuel pin, said fuel material defining at least one internal void, radially inwardly spaced from the radial periphery of said fuel pin.

20. The reactor of claim 19, wherein said fuel pin has a pair of axial ends and a plurality of void spaces are included with a greater percentage of total void space being disposed toward an axial center of said fuel material than toward the axial ends thereof.

21. The reactor of claim 19, wherein at least one of said fuel pins further includes a temperature sensitive tag gas capsule disposed within said one fuel pin for releasing tag gas into said one pin during reactor operation, which capsule includes an elongate tube having a top end and a bottom end and having a top end cap and a bottom end cap fixed to said top and bottom ends with at least one of said end centrally disposed penetrator member mounted in one of said end caps, which penetrator member has a higher thermal coefficient of expansion than said tube, such that upon reactor temperature increase said penetrator member expands at a faster rate than said tube, causing rupture of one of said end caps.

* * * * *